United States Patent
Salakari

[11] 3,913,650
[45] Oct. 21, 1975

[54] ANTISKIDDING DEVICE FOR MOTOR VEHICLE TIRE

[76] Inventor: Usko Martti Johannes Salakari, 21500 Piikkio, Finland

[22] Filed: Nov. 28, 1973

[21] Appl. No.: 419,877

[30] Foreign Application Priority Data
Nov. 28, 1972 Finland.............................. 3355/72
Nov. 28, 1972 Finland.............................. 3356/72

[52] U.S. Cl. ............................................... 152/210
[51] Int. Cl.² ......................................... B60C 11/16
[58] Field of Search .......... 152/210, 211, 212, 229, 152/169, 222

[56] References Cited
UNITED STATES PATENTS
938,116   10/1909   Bray................................... 152/210
1,298,915  4/1919   Cruzan............................... 152/169
3,473,591  10/1969  Bingham............................. 152/210
3,538,970  11/1970  Shwader............................. 152/210
3,545,515  12/1970  Gottauf.............................. 152/210
3,786,849  1/1974   Logvist.............................. 152/210

Primary Examiner—Drayton E. Hoffman
Assistant Examiner—Hadd S. Lane
Attorney, Agent, or Firm—Watson, Cole, Grindle & Watson

[57] ABSTRACT

A stud assembly embedded in a motor vehicle tire includes a stud having an elongated shank projecting outwardly of the tire, and a head at the inner end of the stud in contact with a portion of the tire. A core member surrounds the stud and its head in a manner to permit axial movement of the stud relative thereto, and to stabilize the stud during such movement.

6 Claims, 6 Drawing Figures

ANTISKIDDING DEVICE FOR MOTOR VEHICLE TIRE

This invention relates generally to a stud assembly for a motor vehicle tire, and more particularly to such an assembly wherein the stud is surrounded by a core member permitting it to move outwardly of the tire in a stable manner without the stud or the core member becoming unduly worn during use.

In the presently used studded tires, the studs are normally firmly engaged with a core member or sleeve for movement therewith inwardly and outwardly of the tire. These studs are provided with enlarged heads at their inner ends which, together with the core or sleeve members at such ends, press against the woven layers of the body of the tire during their axial movement. By reason of such construction, the studs and their connected sleeves require large forces to effect their axial movement which not only causes a weakening of the woven layers, but also an undue wear on the pavement or roadway each time the stud and its sleeve move outwardly of the tire. Moreover, the tire in the vicinity of each stud is severely strained each time the stud is moved transversely during the pulling and braking operations of the tire. The stud is placed in various inclined positions during such operations, and is abruptly shifted in transverse directions especially during impact between the tire and a blunt object such as a roadway curb. Such stud movements have effected undue weakening and laceration of the tire especially in the vicinity of the enlarged heads. The result is that the studs are apt to work themselves loose.

The forces required in axially moving the studs and their core members are a function of both the weight of the studs and the speed of the vehicle. An average-sized wheel of a motor vehicle rotates approximately 17 times per second while driving at a speed of 120 kilometers per hour. If the weight of a steel stud is 3.2 grams, the stud tends to move outwardly of the tire with a force of approximately 1,040 grams. For an aluminum stud of 0.9 grams, the corresponding force is 330 grams. Even with the use of such lighter-weight studs, they are accelerated in their movement outwardly of the tire under large forces which not only subjects the tire to large strains in the vicinity of the stud heads, but also causes the studs and their core members to impinge upon the pavement with great force. The strain placed upon the pavement under such conditions is especially great whenever heavy steel studs are used for their wear resistent capability. Moreover, the studs projecting outwardly of the tire have a tendency to easily twist thereby additionally causing tire rupture and, most importantly, reducing the effectiveness of the studs as they tend to slip on the pavement.

It is therefore an objective of the present invention to provide a stud assembly for motor vehicle tires wherein undue wear of the stud is avoided as well as unnecessary wearing of the roadway or pavement.

Another object is to provide such a stud assembly wherein each stud is surrounded by a core member for axial movement relative thereto, the core member being anchored in place and spaced inwardly of the tire working surface. The stud is provided with an enlarged head gradually tapering toward the shank portion of the stud so as to minimize any strains on the tire in the vicinity thereof during axial movement of the stud.

A further object of the present invention is to provide such a stud assembly wherein the core member alternatively comprises telescoping sections moveable axially relative to each other to thereby insure a relatively constant spacing between the core member and the tire working surface during wear of the tire.

Other objects, advantages and novel features of the invention will become more apparent from the following detailed description of the invention when taken in conjunction with the accompanying drawings wherein.

Figure 1:
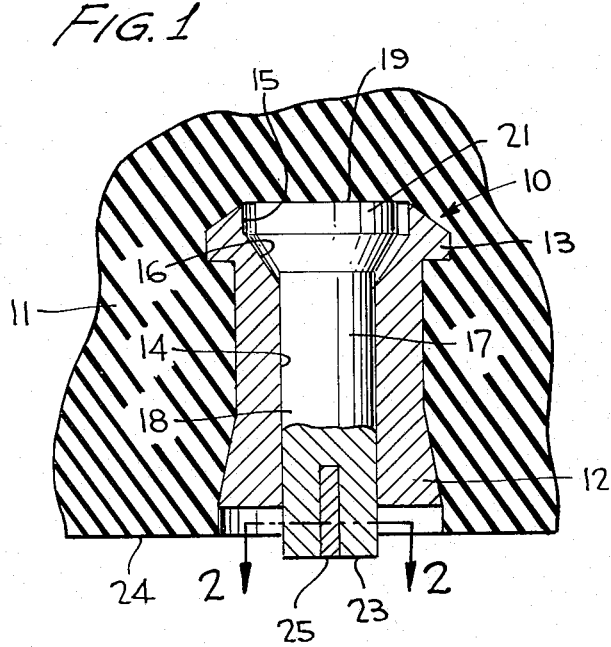
FIG. 1 is an elevational view partly in section of one embodiment of the stud assembly in accordance with the invention shown imbedded in a motor vehicle tire.

Turning now to the drawings wherein like reference characters refer to like and corresponding parts throughout the several views, the stud assembly generally designated 10 is shown in FIG. 1 imbedded in the tread portion 11 of a rubber tire or other working member. The assembly comprises a core or sleeve member 12 of metallic construction having a peripheral outwardly extending flange 13 at its inner end for anchoring the core member in place. A smooth central opening 14 is provided in the core member, as well as a recessed inner end having a cylindrical wall section 15 and a wall section 16 sloping toward opening 14 and interconnecting the wall of this opening with wall section 15.

The assembly further comprises a solid metal stud member 17 having a cylindrical shank portion 18 of a diameter substantially equal to the diameter of opening 14. An enlarged head 19 is provided at the inner end of the shank portion and is surrounded by wall sections 15 and 16. This enlarged head is shaped as having a short cylindrical section 21 of a diameter larger than the diameter of shank portion 18, and a conical section 22 tapering toward the shank portion and interconnecting it with section 21.

The outer end 23 of the shank portion normally extends slightly outwardly of wearing surface 24 of the tire. Also, core member 12 is spaced slightly inwardly of wear surface 24.

During use of such assembly, stud 17 is capable of axial movement relative to core member 12 and, by reason of the gap between the enlarged head and walls 15, 16, the mass of the core member does not resist movement of the stud outwardly of the tire. The force tending to move the core member outwardly is therefore smaller as compared to those prior art designs wherein the stud and the core member are interconnected. With the core member remaining anchored within the tire tread portion, the extent of outward movement of the stud relative to wear surface 24 of the tire is less as compared to prior art designs since the mass of the core member is not coupled with that of the stud. Moreover, the stud has less of a tendency to move transversely into an inclined position as it moves outwardly by reason of the stabilized condition thereof during its movement. With decreased centrifical forces causing outward movement of the studs, stud wear at outer end 23 thereof is minimized, and pavement wear is decreased. Furthermore, with the moving stud mass being less as compared to the combined moving mass of the stud and core member in earlier designs, less force is needed to move the stud inwardly thereby minimizing wear between enlarged head 19 and the adjacent tire body.

Figure 2:
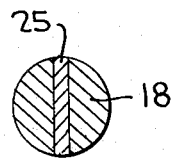
FIG. 2 is a cross-sectional view of the stud taken along line 2—2 of FIG. 1.
Figure 3:
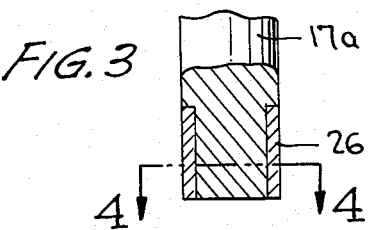
FIG. 3 is a view partly in section of a part of a stud similar to that shown in FIG. 1.
Figure 4:
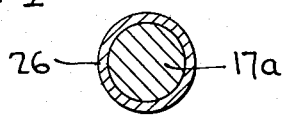
FIG. 4 is a cross-sectional view of the FIG. 3 stud taken along line 4—4 thereof.

In order to increase the wear resistance of the stud at its outer end 23, an insert element 25 may be secured in place at this outer end as shown in FIGS. 1 and 2, such plate having a different hardness characteristic as compared to that of shank portion 18. Alternatively, a stud such as 17a may be provided as having a sleeve 26 fixedly secured at outer end 23 as shown in FIGS. 3 and 4, this sleeve likewise having a different hardness characteristic as compared to that of stud 17a.

Figure 6:
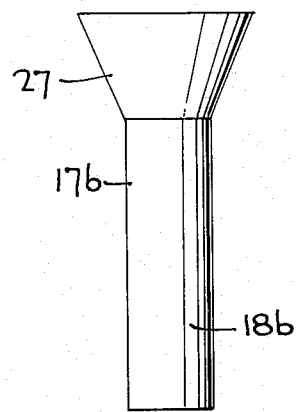
FIG. 6 is a side elevational view of another embodiment of a stud usable in the assembly of either FIGS. 1 and 5.

If desired, the stud assembly can be modified so as to include a stud such as 17b shown in FIG. 6 which is similar to stud 17 except that its enlarged head 27 comprises only a conical section tapering toward shank portion 18b. Of course, core member 12 must be modified to eliminate wall section 15 and to extend wall section 16 so as to provide an enlargement in the core member which will accommodate head 27 similarly as in FIG. 1.

Figure 5:
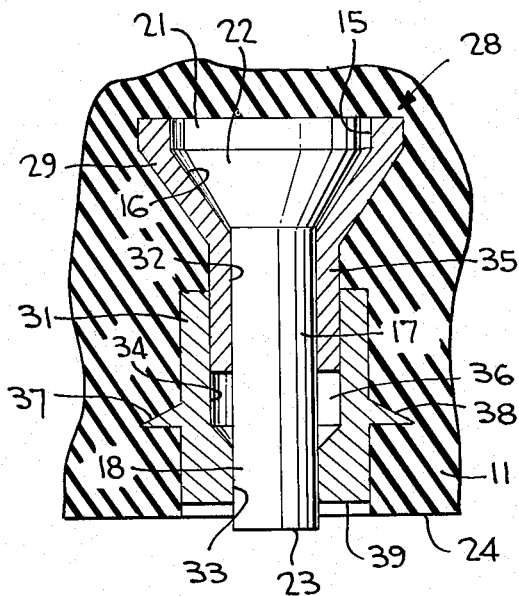
FIG. 5 is a view similar to FIG. 1 showing another embodiment of a stud assembly in accordance with the invention, and imbedded in a motor vehicle tire.

Another embodiment of a stud assembly 28 is shown in FIG. 5, similar to that of FIG. 1 except that a telescoping core member is provided as including interengaged sections 29 and 31. Section 29 is provided with a central opening 32 of a size substantially equal in diameter to that of shank portion 18 of the stud. An enlargement is provided at the inner end of section 29 as defined by wall sections 15 and 16 similar to that of FIG. 1.

Section 31 of the core member is likewise provided with a central opening 33 of a diameter substantially equal to that of shank 18, this central opening being provided near the outer end of the section. The remainder of section 31 is provided with a coaxial opening 34 of a diameter equal to that of the shank portion plus twice the thickness of a wall 35 of section 29. Wall 35 extends into this coaxial opening such a distance as to leave a space 36 for the sections 29 and 31 to axially move relative to one another. Also, section 31 is provided with outwardly extending means for anchoring it in place, such means comprising a pointed peripheral flange 37 or a series of barbs provided in lieu thereof.

Operation of stud assembly 28 is similar to that of assembly 10 as described above except that telescoping sections 29 and 31 are capable of axial movement relative to one another during axial movement of the stud. By reason of flange 37 having a sloping surface 38 as shown in FIG. 5, section 31 is capable of shifting slightly inwardly during wear at its outer end 39. Likewise, the forces exerted on the tire portion adjacent the inner end of section 29 during axial movement of the stud are minimized by reason of the telescoping arrangement between sections 29 and 31.

Heretofore, the studs used in the various tire-studded arrangements were usually made of a tungsten-carbide material, the hardness of which being between approximately 1,380 and 1,520 Vickers (using the Vickers hardness test). These studs have, however, been found to be too hard and to wear too slowly for effective studded tire use. Even with the use of such studs in the assembly according to the present invention wherein the studs are free to axially move relative to their core members rather than being fixed thereto as before, the wear at end 23 of the stud does not correspond to that of the rubber tire at wearing surface 24. Accordingly, the stud projects too far outwardly of the tire.

The wear at the outer end of the stud depends essentially on the vertical force of the stud on the roadway or pavement. There is a relationship between the exerting force and the exertion surface. The heretofore rigid construction stud having a diameter of 8 mm results in a ground contacting surface area of 50 mm$^2$, while a 5 mm diameter stud of the invention results in a ground contact surface area of 9.5 mm$^2$.

In order to avoid this undesirable wearing relationship between the stud and the tire, a stud of softer composition is used. Experimentation has shown that a better wear ratio between the stud and the tire can be effected with the use of a stud having wear characteristics substantially equal to that of tempered steel. The hardness of such material is approximately between 60 and 70 Rockwell C, or approximately 550 to 650 Vickers, and on a very hard road surface — 1,000 Vickers. Such hardness characteristics have been found to produce a wear of the stud in approximately the same proportion as wear of the rubber tire. Tests results were gathered for a radial tire with a stud assembly of the following dimensions: core member outer diameter at stud shank = 9 mm, overall length = 8.5 mm; shank portion outer diameter = 3 mm; stud length = 10.5 mm. The outer diameter of the enlarged head of the stud was 6 mm. By varying this dimension the exertion force of the stud and thus the pressure at the outer end of the stud against the road surface can be regulated.

In arriving at the above-noted hardness characteristics, a suitable homogenous material or one containing several dissimilar materials were chosen for the stud. Alternatively, a plate 25 or sleeve 26 of material different from that of the stud, or of a material composed of different materials itself, were chosen. Also, to increase the hardness of the stud various hard materials in powder form can be cemented to the outer end of the stud.

In view of the foregoing it can be seen that the axially moveable stud arrangement of the present invention serves to minimize wear thereof as well as pavement wear for the studded tire in a simple, economical and highly effective manner. This stud can be made of as large a diameter as necessary to increase its holding characteristics especially on soft surfaces such as snow or sand. Relative movement between the stud and its core member avoids transverse movement of the stud during operation, and the exerting force of the stud on the pavement can be varied by changing the size of the enlarged head thereof. With additional surface contact between the enlarged head and the core member, a smaller pressure per unit area on the road surface can be achieved to thereby considerably reduce wear of the stud. Moreover, the stud in its assembly is practically self-cleaning since no abrupt corners are formed between the stud and its core member where dirt and debris could be lodged.

Obviously, many other modifications and variations of the invention are made possible within the light of the above teachings. It is therefore to be understood that within the scope of the appended claims the invention may be practiced otherwise than as specifically described.

What is claimed is:

1. A tire stud assembly capable of being imbedded in an elastomeric ground wheel tire, comprising a stud having an elongated cylindrical shank portion for extending outwardly of the tire at its outer end and an enlarged head portion at its inner end, said head portion tapering toward said shank portion, an elongated sleeve member completely surrounding said shank portion of said stud thereby spacing said shank portion from said tire, said sleeve member being open-ended and having an axial and cylindrical through opening of a diameter substantially equal to the diameter of said stud, said sleeve member having a length slightly less than the length of said stud, and said sleeve member embracing said shank portion along said sleeve member opening, outwardly extending means on said sleeve for engaging the tire so as to anchor said sleeve in place, said sleeve having an enlarged head portion with an interior recess at its inner end surrounding and slightly spaced from said stud head portion, said stud extending outwardly of the tire, and said stud head portion having an enlarged flat inner end received in said recess and contacting engagement with a portion of the tire, whereby said stud is capable of sliding movement inwardly of said sleeve as its outer end is made to contact the ground upon rotation of the wheel, and is capable of limited sliding movement outwardly of said sleeve against the action of the tire portion.

2. The stud assembly according to claim 1 wherein said stud head portion comprises a short cylindrical section at said flat inner end, and further comprises a conical section interconnecting said cylindrical section with said shank portion.

3. The stud assembly according to claim 1 wherein said stud head portion comprises a truncated cone tapering toward said shank portion, and said sleeve head portion having a shape complementary to said stud head portion.

4. The stud assembly according to claim 1 wherein said shank portion is formed of a wear resistant metallic material, and another wear resistant metallic material being provided at said one end of said shank portion.

5. The stud assembly according to claim 1 wherein said means extending into the tire comprises a pointed extension on the outer wall of said sleeve, said extension having a flat outer side and an inwardly sloping opposite side, to thereby prevent outer movement of said sleeve yet permit inner movement thereof with respect to the tire.

6. A tire assembly capable of being imbedded in an elastomeric ground wheel tire, comprising a stud having an elongated cylindrical shank portion for extending outwardly of the tire at its outer end and an enlarged head portion at its inner end, said head portion tapering towards said shank portion, an elongated sleeve member surrounding said head portion and said shank portion of said stud, said sleeve member being open-ended and having an axial and cylindrical through opening within which said stud is located for sliding movement, said sleeve member comprising a pair of telescoping sections arranged for axial movement relative to one another, one of said telescoping sections being spaced inwardly of the tire so as to avoid excessive wear during use, outwardly extending means on the outer wall of said one section for engaging the tire so as to anchor said sleeve in place, said sleeve having an enlarged head portion at its inner end adjacent and slightly spaced from said stud head portion, said stud being slightly longer than said sleeve member so as to extend outwardly of the tire, and said stud head portion having a flat inner end for contacting with a portion of the tire, whereby said stud is capable of sliding movement inwardly of said sleeve as its outer end is made to contact the ground upon rotation of the wheel, and is capable of sliding movement outwardly of said sleeve against the action of the tire portion.

* * * * *